United States Patent [19]
Wagener

[11] Patent Number: 5,008,483
[45] Date of Patent: Apr. 16, 1991

[54] HOLDERS WITH BUSBARS FOR A BUSBAR SYSTEM

[76] Inventor: Hans Wagener, Rittershäuser Str. 14, 6344 Dietzhölztal-Rittershausen, Fed. Rep. of Germany

[21] Appl. No.: 333,127

[22] Filed: Apr. 4, 1989

[30] Foreign Application Priority Data

Apr. 6, 1988 [DE] Fed. Rep. of Germany ....... 3811455

[51] Int. Cl.$^5$ .............................................. H02G 5/00
[52] U.S. Cl. ................................ 174/68.2; 174/71 B; 174/88 B
[58] Field of Search ................... 174/16.2, 68.2, 70 B, 174/71 R, 71 B, 72 R, 72 B, 72 C, 84 S, 88 B, 88 S, 99 B, 99 E, 100, 129 B, 133 B, 149 B, 171; 361/342, 342, 353, 355, 361, 363, 376, 378; 439/110, 113, 114, 115, 119, 120, 207, 210, 212, 213, 214

[56] References Cited
U.S. PATENT DOCUMENTS
3,821,688 6/1974 Larsile .................................. 439/209

FOREIGN PATENT DOCUMENTS
7435327 1/1975 Fed. Rep. of Germany .
3143518 5/1983 Fed. Rep. of Germany ...... 439/119
2432756 2/1980 France ............................. 174/99 B Primary Examiner—Laramie E. Askin
Attorney, Agent, or Firm—Malcolm B. Wittenberg

[57] ABSTRACT

A holder with busbars for a busbar system, the holder being an insulating support with receptacles located in its top. A number of busbar sections are fixed in position in the receptacles at regular intervals parallel to one another. Protected wiring of electrical equipment connected to the busbar sections is achieved by the insulating support being formed as a carrier plate that extends over the lengths of the busbar sections fixed in position in the receptacles; by at least between adjacent busbar sections, a row of openings being located in the carrier plate, the openings being aligned one above the other perpendicularly to the busbar sections; and by recesses serving as cable ducts being located in the bottom of the carrier plate, the recesses connecting the openings aligned one above the other perpendicularly to the busbar sections to one another and to the longitudinal sides of the carrier plate running parallel to the busbar sections.

13 Claims, 3 Drawing Sheets

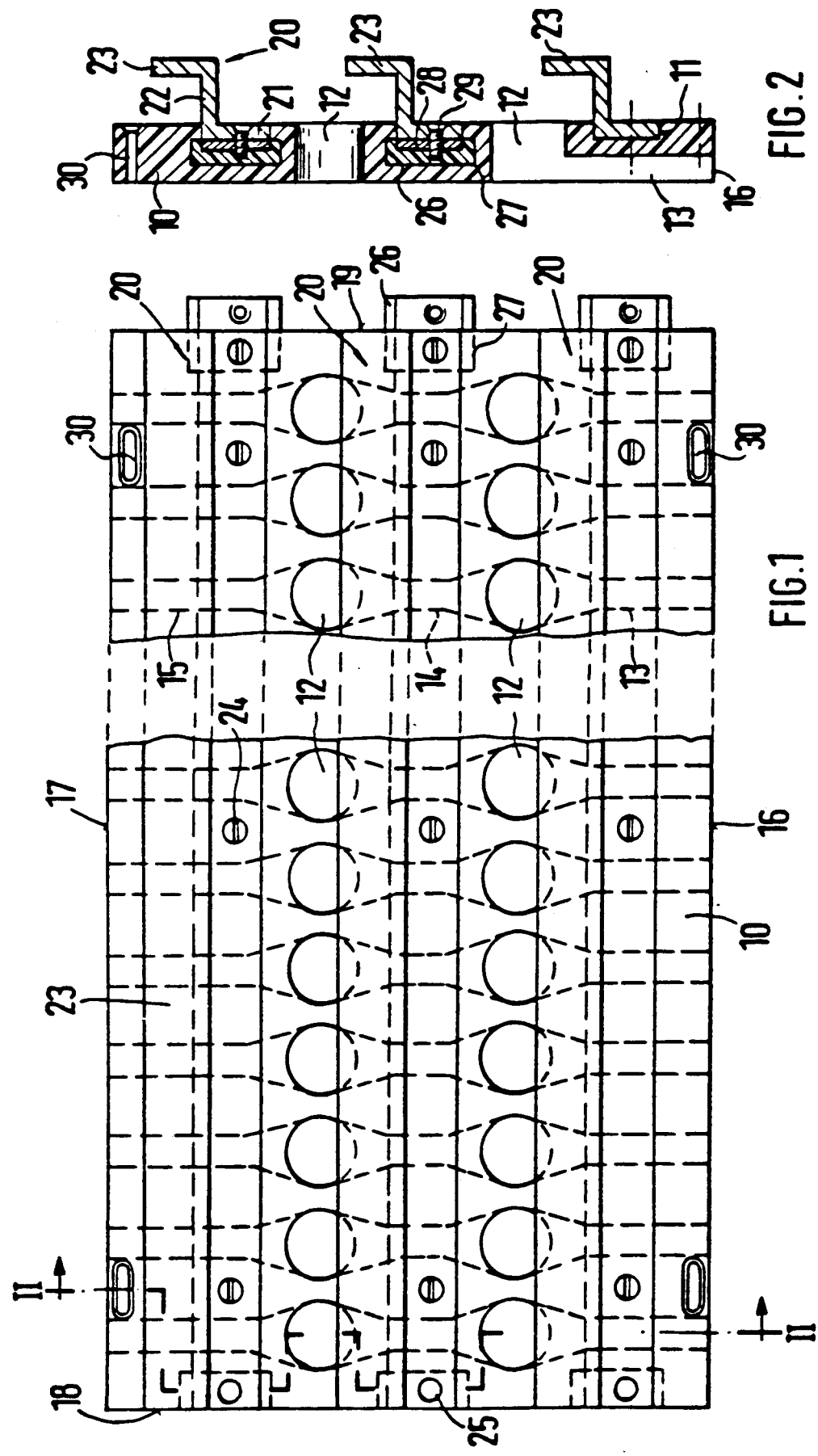

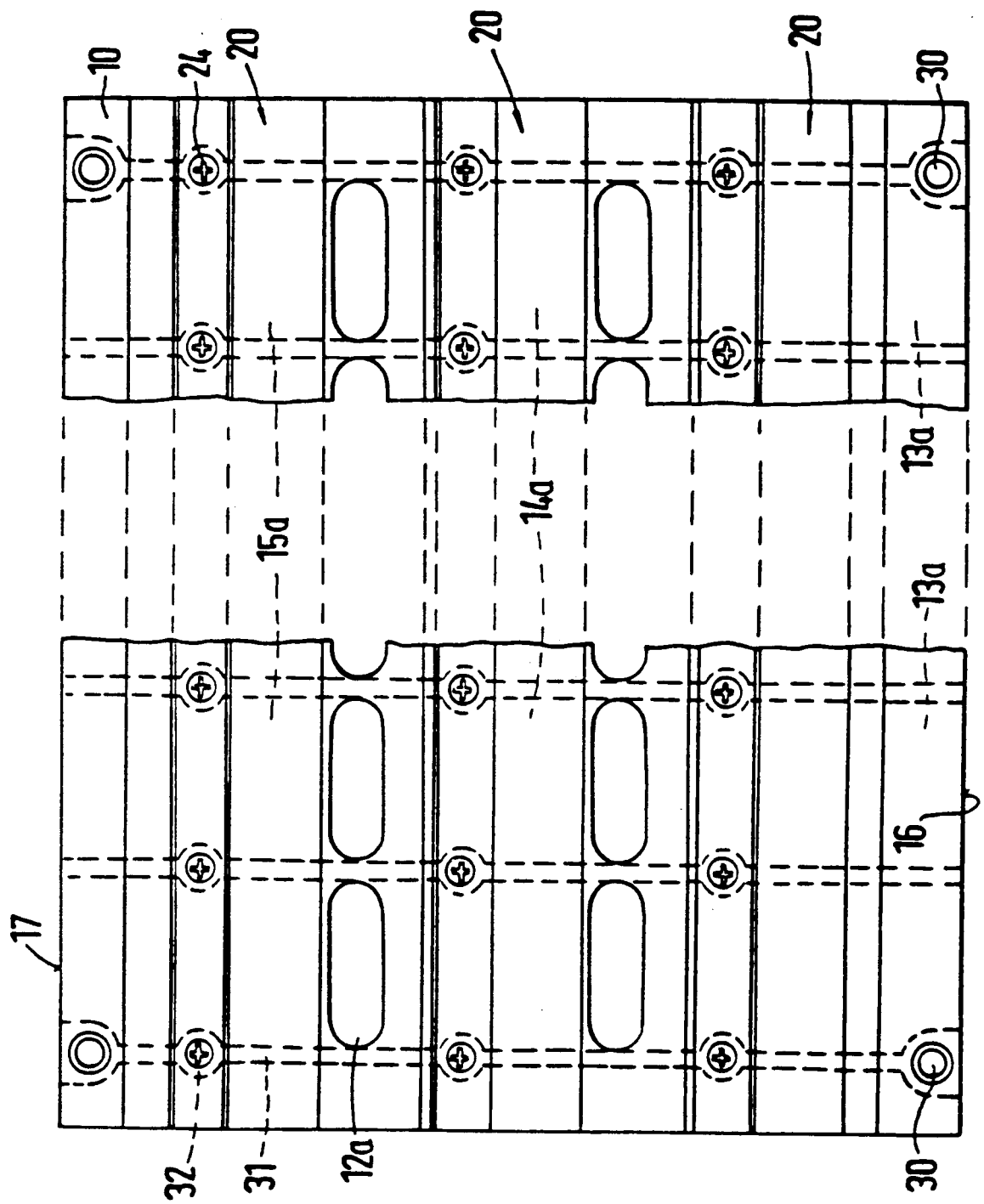

HOLDERS WITH BUSBARS FOR A BUSBAR SYSTEM

The invention concerns a holder with busbars for a busbar system, the holder consisting of an insulating support with receptacles in its top. A number of busbar sections are fixed in position in said receptacles at regular intervals parallel to one another.

A holder of this type is disclosed in German patent No. 31 43 518 (corresponding U.S. Pat. No. 4,457,481). The insulating support in that case is designed as a narrow, cuboid mounting piece extending perpendicularly to the busbar sections and fixing these sections in position at a distance from the mounting surface. The busbar sections are fixed in position to the mounting surface by means of this type of holder along the longitudinal direction of the busbar sections at a number of points located at a distance from one another. Electrical equipment may be connected directly to the busbar sections between the cuboid holders. In this case, the connecting cables for electrical equipment are routed unprotected to the connecting contacts of the electrical equipment. This wiring method has a disadvantage that not only are the connecting cables not laid neatly, but also they may come into contact with the live parts of the busbar system carrying a different potential, so that the possibility of short circuits exists.

It is the object of the invention to produce a holder with busbars of the type described alone for which the electrical equipment mounted on the busbar sections can be wired with neatly laid, protected connecting cables.

The invention achieves this object in that the insulating support is designed as a carrier plate extending over the lengths of the busbar sections fixed in position in the receptacles; that, at least between adjacent busbar sections, a row of openings is located in the carrier plate, said openings being aligned one above the other perpendicularly to the busbar sections; and that recesses, serving as cable ducts, are located in the bottom of the carrier plate, connecting the openings aligned one above the other perpendicularly the busbar sections to one another and to the longitudinal sides of the carrier plate running parallel to the busbar sections.

In this design, the holder with its carrier plate extends over the entire lengths of the busbar sections and exhibits cable ducts aligned perpendicularly to the longitudinal direction, said ducts being routed to the top of the carrier plate in the areas of the openings. The connecting cables can thus be routed directly, depending upon the manner of mounting of the electrical equipment, to the right place of the carrier plate in a cable duct and routed up through an opening in an area of the busbar sections so that they may be connected to the contacts of the electrical equipment after traversing a short distance. In this respect, the connecting cables are routed and protected by the carrier plate and cannot come into contact with other, live parts of the busbar system. In addition, the wiring of the electrical equipment is visually more pleasing.

In one design, the openings are designed as circular holes arranged at regular intervals with respect to one another in the longitudinal direction of the busbar sections. Alternatively the holes are designed as elongated holes that are aligned with their larger dimensions in the longitudinal direction of the busbar sections and that are arranged at regular intervals with respect to one another. The recesses which serve as cable ducts provide sufficient space for connecting cables in that the recesses extend over a portion of the thickness of the carrier plate corresponding to roughly one-third up to one-half of the thickness of the carrier plate.

The busbar sections are fixed in position on the carrier plate in one design by the busbar sections being screwed to the carrier plate. In this respect, to be more advantageous, it is foreseen that the screw locations of the busbar sections be arranged in the longitudinal direction at equal intervals with respect to one another and aligned one above the other perpendicularly to the busbar sections in order to be able to use uniformly designed busbar sections.

The space for the cable ducts can be enlarged due to the fact that the bottom of the carrier plate has crosspieces running perpendicularly to the busbar sections in the areas of the screw locations, said crosspieces ending in a common mounting plane of the carrier plate and exhibiting cylindrical extensions in the areas of the screw locations. Then it is intended that the openings of the carrier plate designed as elongated holes extend beyond the area of the carrier plate located between adjacent crosspieces in order to be able to route the connecting cables over the entire width of the cable ducts to the top of the carrier plate.

Electrical equipment can then easily be connected to the busbar sections if the design is such that the busbar sections have a Z-shaped cross section of which one cross arm thereof, functioning as a mounting arm is inserted into the receptacles of the carrier plate and screw-mounted to plate, and that the other cross arms of the Z-shaped busbar sections, functioning as connecting arms, are located at a distance from and parallel to the top of the carrier plate.

The busbar system can easily be extended in that the receptacles in the area of the narrow sides of the carrier plate running perpendicularly to the busbar sections change into expanded connecting receptacles for connecting elements which connect the busbar sections of carrier plates joined in a row to one another so that they can conduct electrically, and in that the carrier plate is designed to be angular with two carrier plate sections that are perpendicular to one another and accommodate angular busbar sections, and in that, in both carrier plate sections, the recesses run perpendicularly to the carrier plate sections and to the busbar sections fixed in position in said recesses of the carrier plate sections.

The angular carrier plate can be composed, in another design, of two partial carrier plates, the narrow sides facing one another having complementary angles of 45 degrees with respect to the longitudinal direction of the partial sections of the busbar sections.

For mounting the holder to the mounting surface, the carrier plate is provided outside the recesses with mounting holes for mounting hardware such as mounting screws or the like.

The invention is described in more detail on the basis of the implementation examples shown in the drawings.

FIG. 1 is a plan view of the holder with busbars consisting of the carrier plate busbar sections.

FIG. 2 is a sectional view through the holder with busbars along line II—II of FIG. 1.

FIG. 4 is a plan view of another implementation example of a holder with busbars.

Figure 3:
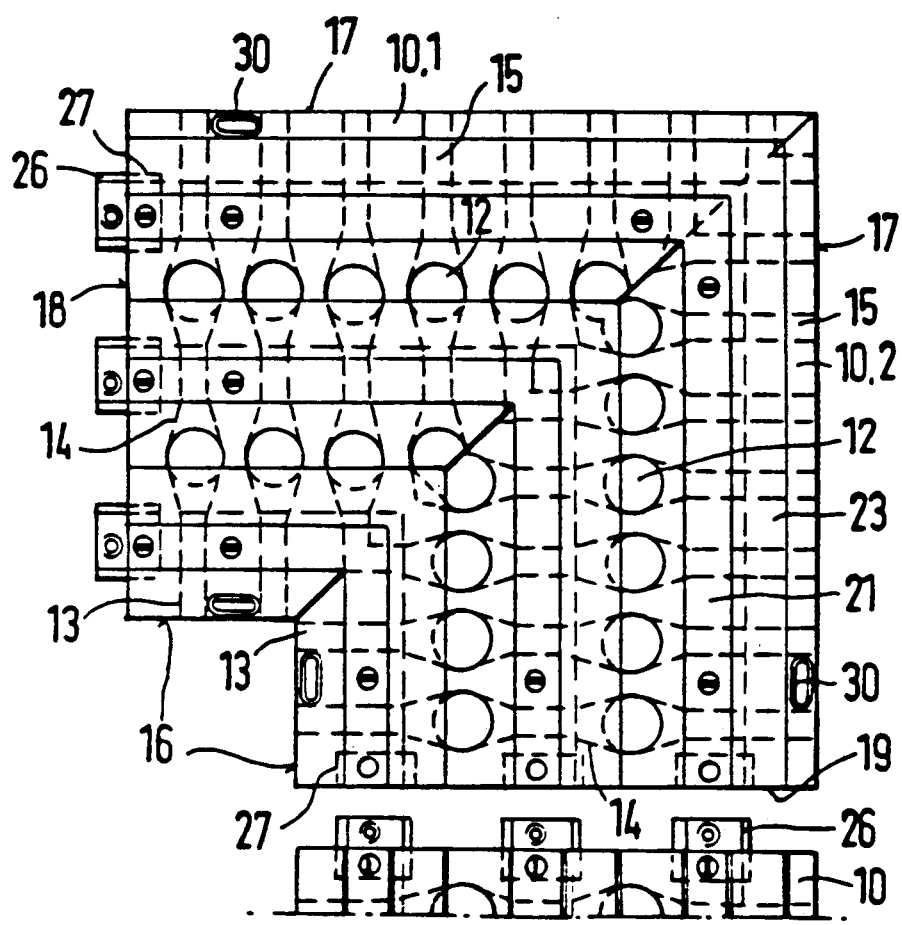
FIG. 3 is a plan view of an angular holder with busbars having two partial carrier plates and angular busbar sections.

The implementation example of FIGS. 1 and 2 shows a holder with busbars that has the carrier plate 10 designed as an insulating support, said carrier plate being rectangular in shape due to its longitudinal sides 16 and 17 and it narrow sides 18 and 19. Three receptacles 11 for three identical busbar sections 20 are located at equal intervals in the top of the carrier plate 10. Each busbar section 20 has a Z-shaped cross section, one cross arm 21 which serves as a mounting arm being screw-mounted to the carrier plate at regular intervals, as shown by the screw locations 24. The other cross arm 23, which is at a specified distance from the carrier plate 10 because of the center arm 22, serves as a connecting arm onto which the electrical equipment is placed. This action produces the electrical connection between the busbar section 20 and the electrical equipment.

The cross section of the receptacle 11 in the top of the carrier plate 10 is matched to the cross section of the cross arms 21 of the busbar sections so that these sections terminate flush with the top. One row of openings 12 in the carrier plate 10 is located between the lower busbar section 20 and center busbar section 20 and another between the center section 20 and upper busbar section 20. These openings 12 are designed in this implementation example as circular holes that are arranged at regular intervals in the longitudinal direction of the busbar sections 20 and the carrier plate 10.

Perpendicularly to the busbar sections 20, the openings 12 are aligned one above the other. Slot-shaped recesses 13, 14 and 15 are located in the bottom of the carrier plate 10 that forms the mounting side of the carrier plate 10, said recesses extending roughly over one-third to one-half of the thickness of the carrier plate 10. These recesses 13, 14 and 15 form cable ducts that connect the openings 12 to the longitudinal sides 16 and 17 of the carrier plate 10. The recesses 13, 14 and 15 run perpendicularly to the busbar sections 20 and form cable ducts running perpendicularly to the busbar sections 20 for the openings 12 located one above the other, said cable ducts also being to the corresponding opening 12. A connecting cable can be fed in on the longitudinal side 16 and routed by way of the recess 13 or the recesses 13 and 14 into the one or another opening 12 and routed out of this opening. The connecting cable can, however, also be inserted at the longitudinal side 17 and, by way of the recess 15 or recesses 15 and 14, routed into the one or another opening 12 and out of this opening. The carrier plate 10 covers the connecting cable and prevents contact with live parts. For mounting the carrier plate 10, mounting holes 30 for mounting hardware such as mounting screws are located in the areas near the edges of the longitudinal sides 16 and 17.

The busbar sections 20 terminate flush with the carrier plate 10 on the narrow sides 18 and 19. The receptacles 11 change into expanded connecting receptacles 27 for plate-shaped connecting elements in the area of the narrow sides, said connecting elements providing the electrical connection of the busbar sections 20 when holders with busbars are connected in a row. In the areas of the connecting receptacles 27, the busbar sections 20 have mounting holes 25 for mounting screws 29 that are screwed into the connecting elements. In this respect, each connecting element can be a single conductive piece or can be composed of an insulating portion 26 and a conductive portion 28, as can be seen in the cross-sectional view of FIG. 2. One-half of the portions 26 and 28 protrudes into the connecting receptacle 27 so that two carrier plates 10 can be connected in a row so that they abut.

As the implementation example of FIG. 3 shows, the carrier plate can also be angular and composed of two partial carrier plates 10.1 and 10.2 that, in the area of their joint, form an angle of 45 degrees with respect to the partial sections of the angular busbar sections 20 and together form a miter joint. The partial carrier plates 10.1 and 10.2 may also be combined into a single part. The openings 12 are also located between adjacent busbar sections 20 and the recesses 13, 14 and 15 are perpendicular to the longitudinal sides 16 and 17 of the partial carrier plates 10.1 and 10.2 serving as the outer edges of the angular carrier plate and thus to the partial sections of the angular busbar sections 20. The narrow sides 18 and 19 of the angular carrier plate are then perpendicular to one another and are designed for connecting an additional carrier plate 10 in a row.

The implementation example of FIG. 4 is different in the design of the openings and of the recesses. Crosspieces 31 running perpendicularly to the busbar sections 20 are formed on the bottom of the carrier plate 10, said crosspieces ending in a common mounting plane. These crosspieces 31 connect the screw locations 24 placed one above the other and are provided with cylindrical extensions 32 in these areas. In the FIG. 4 construction recesses 13a, 14a and 15a extend between adjacent crosspieces 31, that are arranged at uniform intervals, as are the screw locations 24, in the longitudinal direction of the busbar sections 20. The openings are designed as elongated holes 12a that extend with their larger dimensions from crosspiece 31 to crosspiece 31. The connecting cables enter at the longitudinal sides 16 and 17 by way of the recesses 13a and 15a.

I claim:

1. A holder with busbars for a busbar system, comprising: an insulating support with receptacles in its top, a number of busbar sections fixed in position in said receptacles at regular intervals parallel to one another,
   the insulating support being designed as a carrier plate that extends over the lengths of the busbar sections fixed in position in the receptacles;
   a row of openings located in the carrier plate at least between adjacent busbar sections, said openings being aligned perpendicularly to the busbar sections one above the other; and
   recesses located in the bottom of the carrier plate which serve as cable ducts, said recesses connecting the openings aligned one above the other perpendicularly to the busbar sections to each other and to the longitudinal sides of the carrier plate running parallel to the busbar sections.

2. A holder with busbars according to claim 1 wherein
   the openings are holes arranged in the longitudinal direction of the busbar sections at regular intervals with respect to one another.

3. A holder with busbars according to claim 1 wherein
   the openings are elongated holes which are aligned with their greater dimensions in the longitudinal direction of the busbar sections and are arranged at regular intervals with respect to one another.

4. A holder with busbars according to any one of claims 1, 2 and 3 wherein
   the recesses extend over a part of the thickness of the carrier plate corresponding to roughly one-third up to one-half of the thickness of the carrier plate.

5. A holder with busbars according to any one of claims 1, 2 and 3 wherein
    the busbar sections are screw-mounted to the carrier plate.

6. A holder with busbars according to claim 5 wherein
    the screw locations of the busbar sections are arranged at equal intervals to each other in the longitudinal direction and one above the other perpendicularly to the busbar sections.

7. A holder with busbars according to claim 6 wherein
    the bottom of the carrier plate has crosspieces running perpendicularly to the busbar sections in the areas of the screw locations, said crosspieces ending in a common mounting plane of the carrier plate and having cylindrical extensions in the areas of the screw locations.

8. A holder with busbars according to claim 7 wherein
    the openings (12) each extend over the area of the carrier plate between adjacent crosspieces.

9. A holder with busbars according to any one of claims 1 to 3 characterized by the fact that the busbar sections have a Z-shaped cross section, are inserted into the receptacles of the carrier plate with one cross arm in each case, and are screwed to said carrier plate; and
    the other cross arms of the Z-shaped busbar sections, functioning as connecting arms, are arranged at a distance from and parallel to the top of the carrier plate.

10. A holder with busbars according to any one of claims 1 to 3 wherein
    the receptacles change into expanded connecting receptacles for connecting elements in the area of the sides of the carrier plate running perpendicularly to the busbar sections, and there are connecting elements in said expanded connecting receptacles for connecting the carrier plate to other carrier plates and for joining the busbar sections with other busbar sections on other carrier plates in rows so as to conduct electrically.

11. A holder with busbars according to any one of claims 1 to 3 wherein
    the carrier plate is angular with two carrier plate sections perpendicular to one another and accommodates angular busbar sections having partial sections; and
    in both carrier plate sections, the recesses run perpendicularly to the partial sections of the angular busbar sections fixed in position in said recesses.

12. A holder with busbars according to claim 11 wherein
    the angular carrier plate is composed of two partial carrier plates, the sides facing one another having complementary angles of 45 degrees with respect to the longitudinal direction of the partial sections of the angular busbar sections.

13. A holder with busbars according to any one of the claims 1 to 3 wherein
    the carrier plate is equipped outside the recesses with mounting holes for mounting hardware.

* * * * *